United States Patent [19]

Bertling et al.

[11] 4,083,338

[45] Apr. 11, 1978

[54] APPARATUS FOR CONTROLLING THE FUEL-AIR MIXTURE OF AN INTERNAL COMBUSTION ENGINE

[75] Inventors: Johannes-Gerhard Bertling, Vaihingen; Hans Zeller, Grafenau; Johannes Brettschneider, Ludwigsburg, all of Germany

[73] Assignee: Robert Bosch GmbH, Stuttgart, Germany

[21] Appl. No.: 764,304

[22] Filed: Jan. 31, 1977

[30] Foreign Application Priority Data

Feb. 4, 1976 Germany .............................. 2604231

[51] Int. Cl.² .................. F02M 23/04; F02N 7/00; F02B 75/10
[52] U.S. Cl. ..................... 123/119 EC; 123/119 D; 123/124 R; 123/124 B; 261/50 A; 261/121 B
[58] Field of Search ........ 123/119 EC, 119 D, 119 E, 123/124 B, 124 R, 124 A, 32 EA; 261/50 A, 121 B

[56] References Cited

U.S. PATENT DOCUMENTS

| | | | |
|---|---|---|---|
| 3,906,910 | 9/1975 | Szlaga, Jr. | 123/119 EC |
| 3,911,884 | 10/1975 | Moriya et al. | 123/119 E |
| 3,963,009 | 6/1976 | Mennesson | 123/119 D |
| 4,010,722 | 3/1977 | Laprade et al. | 123/119 EC |
| 4,022,171 | 5/1977 | Laprade et al. | 123/119 EC |

*Primary Examiner*—Wendell E. Burns
*Attorney, Agent, or Firm*—Edwin E. Greigg

[57] ABSTRACT

The induction manifold of an internal combustion engine is provided with an air bypass conduit which has an air flow metering valve which is controlled by the same differential pressure experienced by the air responsive element of the carburetor in the induction tube. The pressure drop across this valve is further influenced by a second air metering valve acting as a pressure control valve, also located in the bypass line downstream of the first metering valve. A regulator responsive to engine conditions controls valves which cause selective admission of different pressures to the actuation chamber of the pressure control valve to regulate the amount of bypassed air.

12 Claims, 5 Drawing Figures

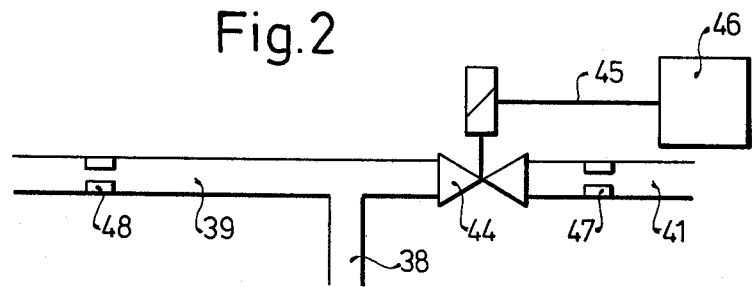
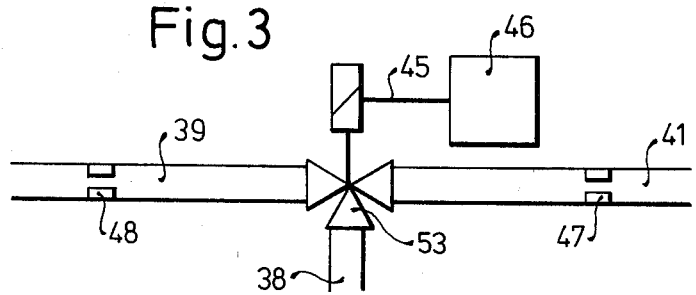
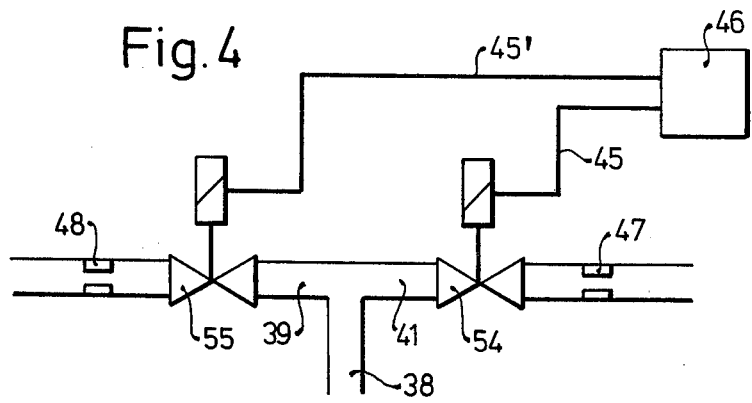

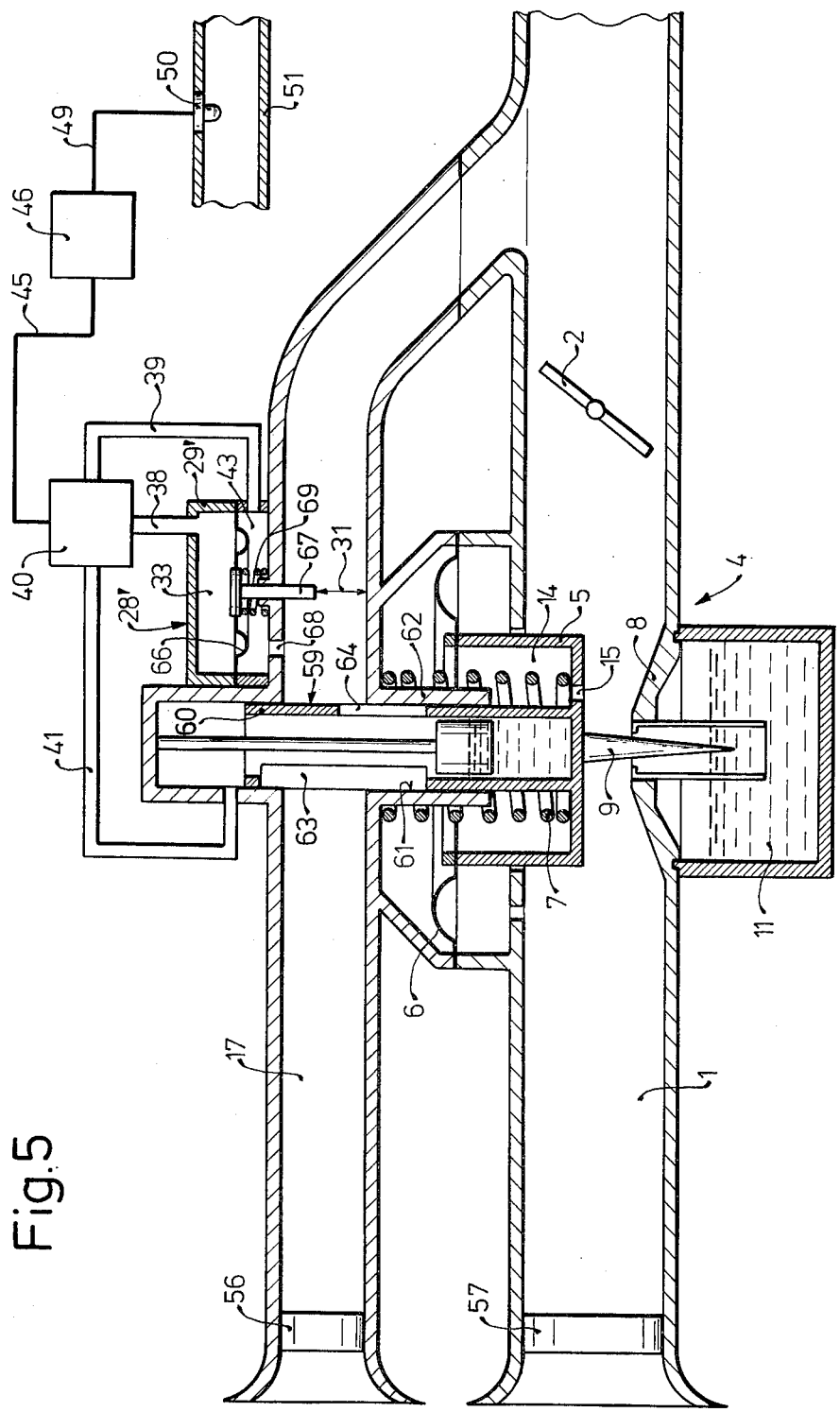

APPARATUS FOR CONTROLLING THE FUEL-AIR MIXTURE OF AN INTERNAL COMBUSTION ENGINE

BACKGROUND OF THE INVENTION

The invention relates to a method and an apparatus for controlling the fuel-air mixture delivered to an internal combustion engine. More particularly, the invention relates to the method of supplying supplementary air to the fuel-air mixture in dependence on operational conditions of the engine by sensing the aspirated air flow quantity and metering out supplementary air through a bypass air line in accordance therewith. The control pressure at the metering location is altered multiplicatively by a pressure control valve whose control pressure varies between two substantially individually constant pressures. In a known method of fuel mixture control, the oxygen content of the exhaust gases is determined and supplementary air is admitted in dependence on the oxygen content of the exhaust gas via a bypass valve. In this known installation, an electronic controller senses the throttle valve position and the rpm of the engine and executes a basic setting of the bypass valve. In addition, the bypass valve is set in dependence on the oxygen content of the exhaust gases. This type of control requires relatively expensive controllers and other apparatus. Furthermore, the position of the throttle valve can be used only in combination with the rpm signal or the induction tube vacuum to determine the amount of fuel-air mixture which is actually aspirated by the engine. Thus, this latter quantity, the magnitude of which must be well known for satisfactory control, is derived only from two separate measured values and is then processed to generate a control pulse for the bypass valve.

OBJECT AND SUMMARY OF THE INVENTION

It is a principal object of the present invention to use a method as described in the introduction to the present specification and to provide an apparatus for carrying out that method so as to obtain rapid and exact control without great expense and to produce a desired fuel-air mixture of a given concentration.

This and other objects are attained according to the invention by providing a bypass air throttle valve provided with a control member and that an air metering piston of an equal pressure carburetor is influenced by induction tube pressures respectively upstream and downstream thereof and that the differences of these control pressures displace the metering piston against the force of a spring. The invention further provides a pressure control valve downstream of the throttle valve and within a bypass air line which also has a control member which defines two work chambers and which is connected with the valve closing member of the pressure control valve. One of the chambers of the pressure control valve is connected with a valve assembly and is supplied either with atmospheric pressure or with another substantially constant control pressure from within the induction system of the engine.

The just described apparatus performs the service of rapidly and exactly measuring the air quantity fed to the engine due to the air metering piston of the equal pressure carburetor. At the same time, according to the invention, the apparatus sets a proportional quantity of supplementary air. The pressure control valve serves the purpose to create a constant pressure downstream of the throttle valve within the bypass line and to use variations of this pressure to affect a multiplicative adjustment of the supplementary air quantity. A control system of this type permits rapid and exact adjustment of the fuel-air mixture even when the engine conditions change abruptly.

A preferred embodiment of the invention provides that the control chamber of the pressure control valve is connected through a conduit to the bypass air line downstream of the throttle valve. This line is connected to the valve assembly and thence with a line between the throttle valve and the pressure control valve.

In this manner a constant pressure drop is maintained at the metering cross section of the bypass air line as is done across the air metering piston of the equal pressure carburetor within the induction tube. By varying the pressure in the chamber of the pressure control valve, the second source of constant pressure provided by this valve permits a rapid multiplicative adjustment.

The invention will be better understood as well as further objects and advantages thereof become more apparent from the ensuing detailed description of preferred embodiments of the invention taken in conjunction with the drawing.

BRIEF DESCRIPTION OF THE DRAWING

FIG. 2 is a schematic illustration of a first variation of the valve assembly for changing the control pressure;

FIG. 3 is a second variant of the valve assembly in FIG. 2;

FIG. 4 is a third variant of the valve assembly; and

FIG. 5 illustrates a second exemplary embodiment of the apparatus according to the invention.

DESCRIPTION OF THE PREFERRED EMBODIMENTS

Figure 1:
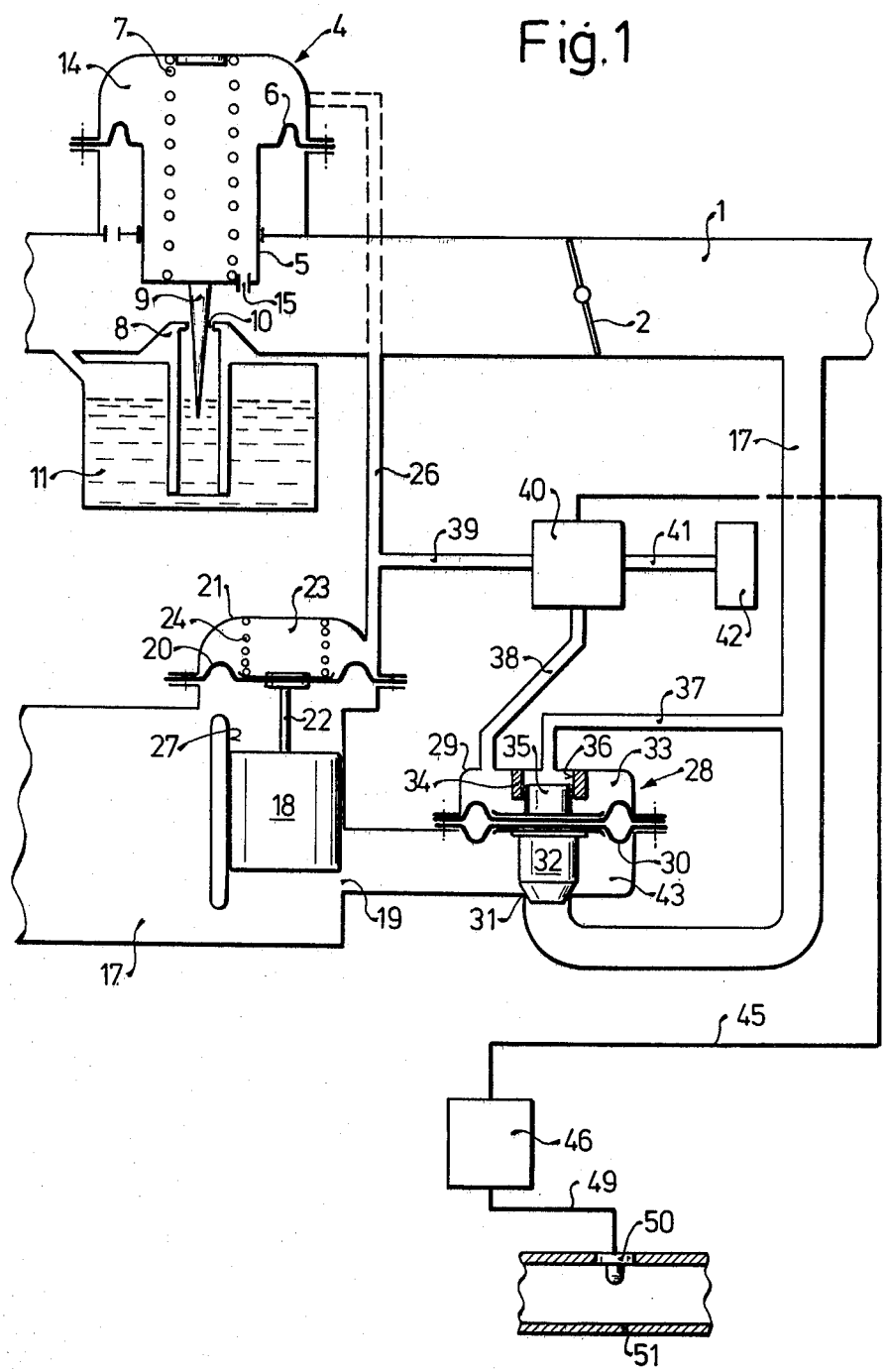
FIG. 1 is an illustration of a first exemplary embodiment of the apparatus according to the invention.

Turning now to FIG. 1, there is shown a portion of the induction system of an internal combustion engine, not further illustrated. The induction tube 1 includes an arbitrarily settable throttle plate 2 the position of which, together with the rpm of the engine defines the quantity of combustible mixture fed to the engine. Upstream of the throttle plate 2, the induction tube 1 includes an equal pressure carburetor 4 including an air metering piston 5 coupled to a diaphragm 6 and loaded by a spring 7. The displacement of the piston 5 occurs transversely with respect to the induction tube within the region of a narrow portion of the induction tube constituting a Venturi 8 wherein a conical needle 9 attached to the piston 5 controls the fuel flow through an opening 10 in a fuel line leading to the flow chamber 11 of the carburetor. The pressure chamber 14 defined by the air piston 5 and the diaphragm 6 is connected through a bore 15 within the piston 5 downstream of the narrowest flow cross section of the induction tube. The other side of the diaphragm 6 experiences the pressure in the induction tube upstream of the carburetor 4. The prior configuration of the induction tube upstream of the carburetor is not further illustrated. However, there would normally be disposed in known manner an inlet air filter which could also supply for example a bypass air line 17 for bypassing the equal pressure carburetor and the throttle plate 2 and terminating downstream thereof in the induction tube.

The bypass air line 17 includes a piston 18 moving in such a way as to control the flow through an aperture 19. The piston has a control diaphragm 20 clamped within a pressure box 21 and rigidly attached via a rod 22 with the piston 18. The diaphragm 20 defines two pressure chambers one of which, namely the chamber 23 remote from the piston 18, includes a spring which loads the diaphragm. This chamber 23 is connected with the induction tube region between the Venturi 8 and the throttle valve 2 via a line 26. As shown in dashed lines in the figure, this line 26 may also lead to the chamber 14 of the equal pressure carburetor 4 which is at the same pressure. The other surface of the diaphragm 20 is exposed to the pressure prevailing in the bypass line 17 upstream of the orifice 19. Both end faces of the piston 18 are exposed to the same pressure to equalize the forces on the piston which is guided in a bore 27.

Downstream of the orifice 19 the bypass line 17 includes a pressure control valve 28 which is mounted in a housing 29 and has a clamped double diaphragm 30 to which is fastened a closure member 32 controlling the flow through the opening 31 of the bypass line 17. The side of the double diaphragm remote from the closure member 32 defines a working chamber 33 together with the housing 29. A bushing 34 surrounds the closure member 32 coaxially and guides a relief pin 35 fixedly attached to the double diaphragm. A line 37 connects the bore 36 of the bushing with the bypass air line 17 downstream of the pressure control valve 28. The control chamber 33 is connected via a line 38 with a valve assembly 40 from which a line 39 leads to the previously described conduit 26. In this manner the valve assembly 40 may create a connection between the region of the induction tube lying between the equal pressure carburetor and the throttle plate on the one hand and the controlled work chamber 33 in the control pressure valve 28 on the other hand. Furthermore, the valve assembly 40 may cause communication via the line 38 with a further line 41 which communicates with the ambient air preferably through an air filter 42. The line 41 may also and alternatively be terminated in the induction tube upstream of the carburetor 4 where clean air and atmospheric pressure is supplied to the pressure control valve 28. The second working chamber of the pressure control valve is a chamber 43 which is in communication with the portion of the bypass line lying between the orifice 19 and the opening 31. FIG. 2 illustrates a first of several possible variants of construction of the valve assembly 40. As shown, the line 41 connects with the line 38 which continues as line 39. The line 41 includes an electromagnetic valve 44 controlled by wiring 45 with a controller 46. The electromagnetic valve may be embodied merely as a shut-off valve or it may include a settable magnet permitting continuous variation of the flow opening of the valve. Each of the lines 41 and 39 contains a throttle 47 and 48, respectively.

Returning to the illustration of FIG. 1, it will be seen that the controller 46 receives signals via a line 49 from a known oxygen sensor 50 on the basis of which the controller engages the valve 44 in analog or cyclic manner and with variable opening times. The oxygen sensor is mounted in a portion 51 of the exhaust gas system, not further illustrated.

The apparatus of FIG. 1 operates in the following manner.

The control diaphragm 20, which experiences the same pressures as does the air metering piston 5, displaces the piston 18 in a manner analogous to that of the displacement of the air metering piston 5. If the motion of the piston 18 with respect to the orifice 19 is properly chosen so as to be adapted to the conditions prevailing at the air metering piston 15, the secondary air flow rate through the bypass line 17 may be made proportional to the main flow rate through the induction tube. The choice of a piston 18 as shown is only exemplary and its place may be taken by a flat slide or some other continuously adjustable throttling or shut-off member which is preferably pressure-relieved. The pressure control valve 28 is provided in order to obtain the same pressure drop across the orifice 19 as obtains across the narrow portion 8 in the induction tube 1. When the electromagnetic valve is closed, the controlled chamber 33 is connected, for example, with the pressure chamber 14 of the carburetor 4. In corresponding manner, the closure member 32 admits the same pressure, or a pressure adapted to the particular construction, to the portion of the bypass line lying between the orifices 19 and 31. The closure member 32 is also pressure-relieved via the line 37 to permit forcefree motion thereof. The pressure now prevailing in the work chamber 33 may be increased by opening the magnetic valve 44, thereby reducing the pressure drop across the orifice 19. Accordingly, the metered-out secondary air flow rate is reduced, thereby enriching the fuel-air mixture fed to the engine.

As illustrated in FIG. 2, the variation of the pressure in the controlled pressure chamber 33 is performed by cyclic or analog control of an electromagnetic valve 44 in dependence on values generated by the oxygen sensor 50. This oxygen sensor is of known construction, for example a construction which senses the partial pressure of oxygen within the exhaust gas and which generates a switching signal when the air factor $\lambda = 1$. A different set-point value may be used if the oxygen sensor and/or the controller 46 are appropriately constructed. Control systems of this type have already been disclosed in several publications and will not be explained in detail here. In a similar manner, other operational parameters of the engine, for example the smoothness of operation, may be used to control a regulating system. In one such system, a transducer senses the dispersion of pressures in the combustion chambers of the engine. It has also been proposed to use changes in the angular speed of the crankshaft of an engine as a control variable. Again as proposed, the ion currents within the combustion chambers may be measured to obtain therefrom a control variable which is associated with the composition of the mixture fed to the internal combustion engine.

FIG. 3 illustrates a second variant of the valve assembly 40. In this illustration, a three-way valve 53 combines the lines 39, 38 and 41. This valve 53 may also be electromechanical and controlled through the line 45 by the controller 46 and may, in similar manner as described above, use a control variable related to the operational condition of the engine. The valve 53 may be operated in analog or cyclic manner. Preferably, when operated cyclically, the valve is embodied as a switching valve which, in one of its positions, creates a connection between the line 38 and the line 39 and which, in the other of its positions, creates a connection between the line 38 and the line 41. As mentioned with respect to the first variant of FIG. 2, the line 39 and the line 41 contain throttles 47 and 48, respectively.

FIG. 4 illustrates a further variant of the valve assembly 40. In this variant, separate electromagnetic valves 54 and 55 are provided in the lines 39 and 41, respectively. These valves are connected through wiring 45 and 45' to the controller 46 and are operated thereby in mutually opposite phase with an opening ratio which corresponds to the magnitude of the control variable. Thus, the line 38 is alternately connected to the line 39 and the line 41. Throttles 47 and 48 are contained in the lines 39 and 41, respectively. The purpose of these throttles is especially the adaptation of the prevailing pressure changes per unit time for the purpose of improving the overall control behavior.

The first embodiment illustrated in FIG. 1 is to be regarded as exemplary because, for example, instead of the pressure control valve 28, other throttles having a different manner of operation and a different effect could also be used. Instead of connecting the line 37 to the closure member 32, the line may also be an axial bore through a closure member which is integral with the relief pin 35.

In a second exemplary embodiment of the invention, illustrated in FIG. 5, a large number of elements are identical to those of the embodiment of FIG. 1 and carry the same reference numerals. An induction tube 1 includes a throttle plate 2 upstream of which there is disposed an equal pressure carburetor 4. A bypass line 17 surrounds the carburetor 4 and the throttle valve 2 and terminates downstream thereof in the induction tube 1. Air filters 56 and 57 are provided to clean the air entering the induction tube 1 and the bypass line 17 and these filters may be combined into a single filter.

In this second exemplary embodiment, the throttling element in the bypass line 17 is a slide 59 constructed as an extension of the air metering piston 5. This slide is concentric with respect to the air metering piston 5 and is affixed as a tube 60 to the side of the piston adjacent to the pressure chamber 14. The tube 60 is guided sealingly within a bore 61 of a bushing 62 extending through the bypass line 17 into the pressure chamber 14. The opposite end of the bushing 62 is tightly closed and provides free passage in the region of the interior of the bypass line. For any transverse position of the tube 60, an opening 63 therein reveals the full cross section of the bypass line 17 whereas, on the downstream side, an opening 64 limits the flow cross section of the bypass line depending on the transverse position of the slide 59. Downstream of the slide 59, there is disposed a pressure control valve 28' having a housing 29' and a control diaphragm 66 defining within the housing a controlled chamber 33 and a work chamber 43. Connected to the diaphragm 66 is a valve closing member or a throttling member 67 which extends into the open cross section of the bypass line 17 and defines thereby a free-flow cross section 31. It will be appreciated that the flat slide 67 may be embodied as well as a plunger, a rotary slide or some other throttling member coupled with the appropriate mechanical ratio to the diaphragm 66. The chamber 43 is continuously communicating with the bypass line 17 via an opening 68 in the region lying between the slide 67 and the slide 69. A spring 69 biases the diaphragm 66 and is located within the chamber 43. The previously referred-to line 38 leads from the control chamber 33 to the valve assembly 40 which also receives the connecting line 41 from the bypass air line 17 downstream of the opening 64 and the connecting line 39 from the chamber 43. The construction of the valve assembly 40 may be the same as already illustrated in FIGS. 2, 3 and 4 and described in connection therewith. As already mentioned, the valve assembly 40 is coupled electrically via a line 45 to a controller 46 which controls its operation based, for example, on the control signals from an oxygen sensor 50.

The present exemplary embodiment of the invention permits a simple and very compact construction and results in a direct proportional association of the flow cross section 19 in the bypass line 17 with respect to the flow cross section at the narrow portion 8 in the induction tube 1. Due to its construction as a valve slide, the displacement of the air metering piston is unaffected by any further construction. In a manner similar to that by which the air metering piston creates a constant pressure within the induction tube, the pressure control valve 28' maintains a constant pressure drop across the orifice 19. This takes place without any multiplicative influence by means of the controller 43 whenever the line 38 is connected with the line 41. When the vacuum in the induction tube increases and thus the pressure downstream of the valve slide 59 decreases, the diaphragm is displaced in opposition to the force of the spring 69 and the flow cross section 31 is reduced by the slide 67. Thus, the pressure in the region between the slide 59 and the slide 67 may then increase again in a manner determined by the area of the diaphragm and the dimension of the spring 69. This pressure control may be altered by means of the valve assembly 40 and the controller 46 in accordance with some sensed control variable so that the controlled chamber 33 receives a mixture of pressures from the pressures prevailing respectively in the lines 41 and 39. Depending on the manner of control by the controller 46, this pressure lies between that prevailing upstream and downstream of the slide 59.

It is also possible to use the line 39 to create a communication to the pressure chamber 14 of the carburetor rather than to the chamber 43 as illustrated in FIG. 1.

The pressure control valve 28' of FIG. 5 may be replaced by the pressure control valve 28 of FIG. 1. In the same manner however, the valve 28' may be used in the exemplary embodiment illustrated in FIG. 1.

If it is desired to maintain a constant charging rate, i.e., a constant degree of charging, the supply of secondary air may also take place in the induction tube region lying between the air flow rate meter and the throttle valve.

The foregoing relates to preferred embodiments and variants of the invention, it being understood that other embodiments are possible within the spirit and scope of the invention, the latter being defined by the appended claims.

What is claimed is:

1. In an apparatus for controlling the fuel-air mixture of an internal combustion engine which includes
    carburetor means actuated by the differential pressure across a venturi in the induction tube;
    a throttle plate located in the induction tube downstream of said carburetor;
    an air bypass line, receiving fresh air at one end and terminating in said induction tube downstream of said throttle valve and including air control means; and
    means responsive to engine conditions, for controlling the action of said air control means in said bypass line;
    the improvement comprising:
    said air control means includes a first air metering valve for metering the air flow through said bypass line, said first air metering valve having control means actuated by the difference of the pressures prevailing upstream and downstream of said carburetor, said control means being biased by a spring in the direction of closure of the air passage in said bypass line;

said air control means includes a second air metering valve for further metering of the air flow through said bypass line, said second air metering valve having pressure responsive means for dividing said valve into first and second operative chambers and for obturating the flow through said bypass line; and said means for controlling the action of said air control means includes valve means actuated by signals from engine sensors for selection of the pressure admitted to said first chamber of said second air metering valve to thereby adjust the degree of opening thereof.

2. An apparatus as defined by claim 1, wherein said control means is the air metering piston of said carburetor and wherein said first air metering means in an air control slide integral with said air metering piston of said carburetor.

3. An apparatus as defined by claim 1, wherein said first chamber of said second air metering valve is connected to said air bypass line upstream of said first air metering valve by means of an air conduit which is itself connectable by said valve means to a region of said bypass line between said first air metering valve and said second air metering valve and wherein said second chamber includes a spring urging said pressure responsive means.

4. An apparatus as defined by claim 1, wherein said first chamber of said second air control valve is connected to the induction tube region lying between said air metering piston of said carburetor and said throttle plate by a line which is itself connectable to ambient air and wherein said second chamber of said second air metering valve is fixedly connected to said air bypass line between said first and said second air metering valves.

5. An apparatus as defined by claim 4, wherein said pressure responsive means in said second air metering valve is an elastic double diaphragm on one side of which there is mounted a valve closing element and on the other side of which there is mounted a pressure relief pin sliding in a guide bore of said valve, including a conduit for connecting the space surrounding pressure relief pin with said air bypass line downstream of said second air metering valve.

6. An apparatus as defined by claim 5, wherein said conduit is a longitudinal bore in said valve closing element and said pressure relief pin.

7. An apparatus as defined by claim 5, wherein said double diaphragm has effective surfaces of different size.

8. An apparatus as defined by claim 1, wherein said means for controlling the action of said air control means is a valve actuated by signals from engine sensors via a regulator and capable of selective admission of fresh air or induction tube air to said first chamber of said second air metering valve.

9. An apparatus as defined by claim 1, wherein said valve means consists of two valves one of which is located between said first chamber and said air induction tube and the other of which is located between said first chamber and a source of ambient air and wherein said first and second valves may be operated in opposite phase and at an operating ratio corresponding to operational conditions of the engine.

10. An apparatus as defined by claim 1, wherein said valve means is a three-way valve located in the junction of a line leading to said induction tube, another line leading to ambient air and a third line leading to said first chamber and wherein said three-way valve is controlled by a regulator corresponding to operational conditions of the engine.

11. An apparatus as defined by claim 1, wherein said valve means is electromagnetic and is continuously adjustable by a regulator responsive to engine conditions.

12. An apparatus as defined by claim 1, wherein said valve means is an electromagnetic valve and is cyclically operated with variable keying ratio by a regulator responsive to engine conditions.

* * * * *